United States Patent [19]
Ennemoser

[11] 3,810,710
[45] May 14, 1974

[54] VEHICLE WHEEL STUD DRILL

[76] Inventor: Joseph O. Ennemoser, 226 Prince of Wales Dr., Gahanna, Ohio 43230

[22] Filed: Aug. 10, 1972

[21] Appl. No.: 279,450

[52] U.S. Cl. ............................... 408/111, 408/712
[51] Int. Cl. ............................................. B23b 45/14
[58] Field of Search ........... 408/111, 110, 115, 135, 408/712, 72, 78, 99, 102, 112, 114

[56] References Cited
UNITED STATES PATENTS
2,341,969  2/1944  Wieser .............................. 408/72
3,667,855  6/1972  Douglass et al ..................... 408/114
2,642,761  6/1953  Goldberg ......................... 408/712 X Primary Examiner—Gil Weidenfeld

[57] ABSTRACT

A drilling tool for boring holes in broken studs of truck wheels. The tool has an internally threaded base which rotatably engages the threaded outer end of an axle housing. A drill press mechanism is adjustably mounted to the base for alignment of the drill bit with a broken stud. The entire tool is subsequently rotated at its threaded base to align the drill bit with other broken studs.

7 Claims, 4 Drawing Figures

VEHICLE WHEEL STUD DRILL

BACKGROUND

This invention relates generally to a drilling tool and more particularly to a drilling tool for use in removing broken studs from the wheel of the vehicle.

An ordinary vehicle wheel has a tire mounted on a metal rim. The rim is mounted to a brake drum, hub or other support structure and is fastened by means of a plurality of circularly arranged spaced stud bolts.

Occasionally, in the operation of the vehicle, especially in the heavy duty operation of a truck, one or more of these studs will become sheared off. If the sheared bolts do not protrude sufficiently to enable gripping them by a suitable tool, they must be centrally bored. A stud extractor, which is a counter threaded, tapered rod is then inserted in the bore and rotated by a wrench or other means into rigid, biting engagement with the bore in the sheared stud. The extractor and engaged stud are rotated further to unscrew the stud.

The common practice in drilling the necessary bores in the sheared studs is to use a hand held electric or pneumatic drill. The drill is hand held in drilling position.

Drilling the studs in this manner is very laborious and the entire repair of the vehicle wheel may take as much as six hours. I have discovered that a primary source of the difficulty in this method of removing the sheared studs is the inability of a human to retain the drill bit aligned along a single drilling axis with a hand held drill. Often the drill bit breaks because of deflections from the drilling axis. This greatly increases the labor and time required for removing the stud.

Additionally, the misalignment of the drill bit often produces a bore at a transverse angle with the stud axis. The drill may bore into the internal threads of the brake drum or other support structure which threadedly engages the threads of the stud. Such a destruction of these internal threads weakens the later connection of a new stud in the weakened thread. It may even necessitate the rethreading of the hole in the brake drum or other structure and the use of an oversized replacement stud.

There is therefore a need for a drilling mechanism which can improve both the quality and the accuracy of the bore in the sheared studs and additionally will considerably reduce the labor and time required to repair a damaged vehicle wheel.

SUMMARY

The invention is a drill mechanism for boring holes in the broken studs of the vehicle wheel, wherein the vehicle wheel has a cooperating axle housing having a thread outer end. The drill mechanism comprises a base including an internally threaded connector member for rotatable, threaded engagement with the threaded end of the axle housing. A drill press apparatus is mounted to the base and aligned for drill bit travel along a path radially spaced from the center of the wheel for alignment with the central longitudinal axis of a stud of the wheel. This mechanism is mounted on the wheel and the bit travel path is radially and angularly aligned with one of the studs to be drilled. The stud is drilled and then the mechanism is rotated at its threadedly engaged part into alignment with another stud of the wheel which needs to be drilled.

Accordingly, it is an object of the invention to provide an improved apparatus and method for removing sheared studs from vehicle wheels.

Another object of the invention is to provide a method and apparatus which very greatly decreases the time required for removing the studs from the vehicle wheel. a. a Still another object of the invention is to provide a method and apparatus which additionally greatly improves the accuracy and the quality of the bore hole drilled in the sheared stud.

Another object of the invention is to provide an apparatus which is adjustable so that it may be used on a variety of sizes of wheels.

Further objects and features of the invention will be apparent from the following specification and claims when considered in connection with the accompanying drawings illustrating the preferred embodiment of the invention.

Figure 1:
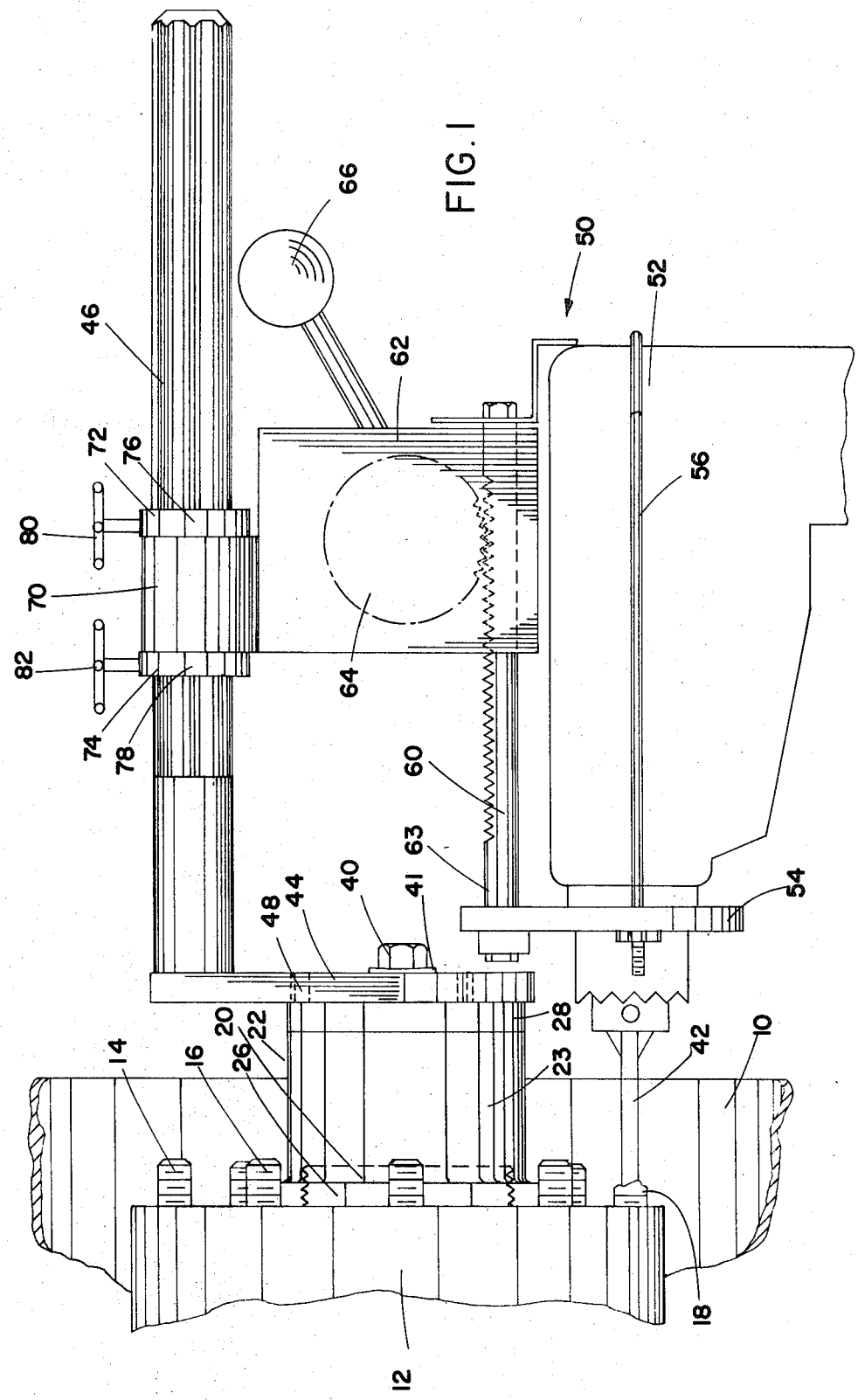
FIG. 1 is a view in side elevation of the preferred embodiment of the invention mounted in operable position on a vehicle wheel.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose.

DETAILED DESCRIPTION

FIG. 1 illustrates the preferred embodiment of the invention mounted in an operable position on a vehicle wheel. A portion of the wheel rim 10 and the wheel hub 12 with its cap removed is illustrated. The circularly arranged studs such as studs 14, 16 and sheared stud 18, protrude laterally from the hub 12. Protruding centrally from the interior of the hub 12 is an axle housing 20 having a threaded end illustrated in hidden lines.

Figure 2:
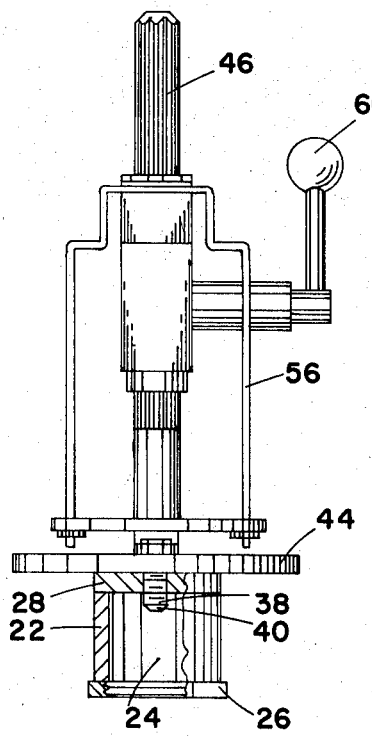
FIG. 2 is a view in front elevation of a preferred embodiment of the invention illustrated in FIG. 1.
Figure 3:
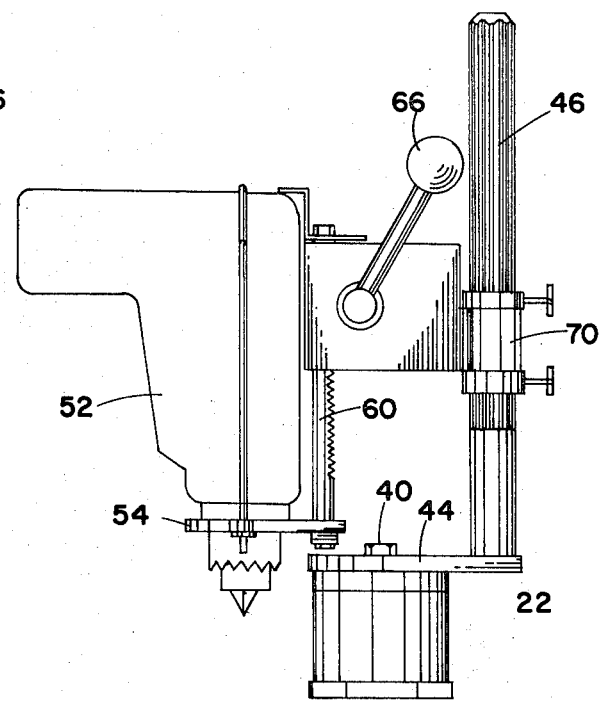
FIG. 3 is a view in side elevation of the preferred embodiment of the invention illustrated in FIG. 2.

The drill mechanism of the invention has a generally cylindrical, hollow base 22 including an internally threaded connector member portion 38 illustrated in section in FIG. 2. The base 22 has internal threads 24 which rotatably and threadedly engage the external threads of the axle housing 20. A hexagonal flange 26 extends radially from the bottom end of base 22 for being gripped by a wrench if desired.

A cap 28 is welded at the top end of the base 22 and is provided with a threaded bore 38 preferably through its central axis. This threaded bore 38 receives a mating threaded fastener such as a hexhead screw 40. A washer 41 is preferably used with the screw 40.

The remaining structure of the preferred embodiment illustrated in the Figures may be described generally as a drill press apparatus which is adjustably mounted to the base 22 by means of the screw 40. In particular it is desirable that the drill press apparatus be radially adjustable relative to the central axis of the base and be releasably fixable by tightening the screw 40 at selected radial positions of adjustment. This permits the drill bit 42 to be radially positioned so that its path of travel is approximately through the central axis of the circularly arranged studs.

The drill press apparatus includes a flat plate member 44 to which a support shaft 46 is attached. The plate member 44 is provided with a slot 48 which permits the plate member 44 to slide radially on the cap 28 when the screw 40 is not tightened against the plate member.

Figure 4:
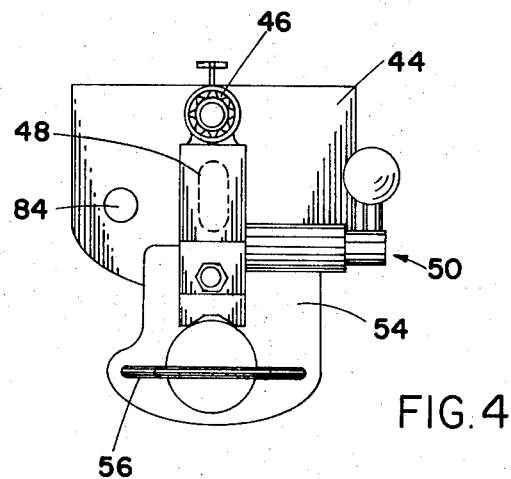
FIG. 4 is a plan view of the preferred embodiment illustrated in FIG. 2.

The support shaft 46 is aligned parallel to the studs 16, 18, etc., to properly align the drill bit rotational drive and linear travel mechanism indicated generally as 50. The drive and travel mechanism 50 includes in the preferred embodiment an electric hand drill 52 mounted in a yoke 54 and clamped to the yoke by a U-bolt 56. The drill 52 is removed from FIGS. 2 and 4 to reveal otherwise hidden structure.

A rack 60 is slidably mounted in a support housing 62 and rigidly attached at its end 63 to the yoke 54. Longitudinal movement or travel of the rack 60 moves the drill bit 42 and the entire electric drill 52 along its path of travel toward or away from the stud 18. The rack 60 is driven by a pinion 64 which is journaled in a suitable bearing to the support housing 62 and is rigidly attached to a crank handle 66. Thus, in the conventional manner, rotation of the crank handle 66 provides linear movement of the drill bit 42.

The support housing 62 is attached to a collar 70 which is longitudinally slidable laong the support shaft 46. Preferably, the support shaft 46 and the collar 70 are matingly splined to retain the entire rotational drive and linear travel mechanism 50 of the drill press against pivotal movement relative to the support shaft 46.

Although the collar 70 could be provided with its own radially threaded set screw, I prefer to use a pair of annular clamps 72 and 74. Each of the clamps comprises a ring member 76 and 78 respectively and a bolt 80 and 82 respectively radially threaded through the ring to seat against the spline shaft 46. These annular clamps rigidly and releasably retain the collar 70 against longitudinal movement relative to the splined shaft 46.

For the convenience of the user of an embodiment of my invention, I prefer to provide a hole 84 (See FIG. 4) in a portion of the plate member 44 which extends substantially beyond the base 22. Such a hole 84 is conveniently used in removing stud extractors from removed studs. The stud and the wedged stud extractor are positioned with the stud extractor extending through the hole 84 and the stud seating around the hole. The end of the stud extractor is tapped with a hammer or other suitable means to drive it out of the removed, sheared stud.

The operation of the preferred embodiment of the invention illustrated in FIG. 1 begins with rotational screwing of the base 22 onto the threaded end of the axle housing 20. The clamps 72 and 74 may be loosened and the entire rotational drive and linear travel mechanism 50 slid away from the base 22 toward the end of the splined shaft 46 so that the drill bit 42 will easily clear the unsheared, protruding studs. The base is screwed onto the threaded end of the axle housing 20 until it is merely finger tight.

The collar 70 may now be slid along the splined shaft 46 until the drill bit is suitably spaced from the end of the studs. With the screw 40 loosened so that the plate member 44 may slide relative to the base 22, the drill bit 42 is radially aligned with a sheared stud, such as the stud 18.

With the drill bit properly positioned, the screw 40 is tightened and the set bolts 80 and 82 are similarly tightened so that the support housing 62, the support shaft 46 and the base 22 are all rigidly fixed relative to each other. The drill 52 is then actuated.

Rotation of the crank handle 66 moves the drill bit 42 to the position illustrated in FIG. 1 to drill a bore in the sheared stud 18. After the stud 18 is suitably drilled, the crank handle 66 is counter rotated to withdraw the drill bit from this stud. The entire mechanism may now be simply rotated so that the base 22 rotates relative to the threaded end of the axle housing 20. By a simple rotational movement the drill bit 42 is rotated into exact alignment above the next sheared stud. The tightened screw 40 and the cooperating splines of the shaft support 46 and the collar 70 assure that the drill bit 42 is moved through a circular arc into the proper alignment with the next sheared stud. Of course, if the drilling mechanism of the invention is used on a fleet of trucks having uniformly positioned studs then the initial adjustments need not be repeated.

A remarkable feature of the present invention is that the ordinary repair time is reduced from a 6 hour period to a 45 minute period. Additionally, the quality of the repair is substantially enhanced because the internal threads of the hub 12 are not damaged by a misdirected manually held drill.

It is to be understood that while the detailed drawings and specific examples given describe a preferred embodiment of the invention, it is for the purpose of illustration only, that the apparatus of the invention is not limited to the precise details and conditions disclosed and that various changes may be made therein without departing from the spirit of the invention which is defined by the following claims.

I claim:

1. A drill mechanism for boring holes in broken studs of a vehicle wheel, said vehicle wheel having a cooperating axle housing having a threaded outer end, said drill mechanism comprising:
   a. a base including an internally threaded connector member for rotatable, threaded engagement around a central axis with the threaded end of said axle housing and further including a polygon shaped flange extending radially from said base for being gripped by a wrench; and
   b. a drill press apparatus radially, adjustably mounted to said base and releasably fixable at selected radial positions, said drill press apparatus having its drill bit travel path radially spaced from and parallel to said central axis for alignment with the central longitudinal axis of a stud of said wheel.

2. A drill mechanism for boring holes in broken studs of a vehicle wheel, said vehicle wheel having a cooperating axle housing having a threaded outer end, said drill mechanism comprising:
   a base including an internally threaded connector member for rotatable, threaded engagement around a central axis with the threaded end of said axle housing; and
   b. a drill press apparatus radially adjustably mounted to said base and releasably fixable at selectable radial positions, said drill press apparatus having its drill bit travel path radially spaced from and parallel to said central axis for alignment with the central longitudinal axis of a stud of said wheel;

wherein base has a cap portion and said drill press apparatus includes a plate member and a support shaft attached thereto, said plate member being radially slidable on said cap portion and being releasably mounted to said cap by a threaded clamping fastener, said support shaft being aligned parallel to said studs and having the drill bit rotational drive and linear travel mechanism mounted thereto.

3. A drill according to claim 2 wherein said plate member has a slot therein and wherein said threaded clamping fastener extends through said slot.

4. A drill according to claim 3 wherein said support shaft is a splined shaft, wherein said drive and travel mechanism is attached to a splined collar which is longitudinally slidable along the support shaft but retained against pivotal movement relative thereto by mating splines and wherein said collar is releasably clampable at selected positions along said shaft.

5. A drill according to claim 4 wherein a pair of annular clamps each comprising a ring and a bolt radially threaded through said ring are mounted one at each end of said collar.

6. A drill according to claim 5 wherein said plate member extends substantially beyond said base and is provided with a bore for use in removing stud extractors from removed studs.

7. A drill according to claim 6 wherein a polygon shaped flange extends radially from said base for being gripped by a wrench.

* * * * *